(12) United States Patent
Dinkel et al.

(10) Patent No.: US 7,201,045 B2
(45) Date of Patent: Apr. 10, 2007

(54) PRESSURE SENSOR MODULE

(75) Inventors: Dieter Dinkel, Schwalbach (DE);
Rüdiger Briesewitz, Bruchköbel (DE);
Peter Hoffmann, Frankfurt am Main (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 158 days.

(21) Appl. No.: 10/534,188

(22) PCT Filed: Oct. 18, 2003

(86) PCT No.: PCT/EP03/11547

§ 371 (c)(1),
(2), (4) Date: May 6, 2005

(87) PCT Pub. No.: WO2004/043754

PCT Pub. Date: May 27, 2004

(65) Prior Publication Data
US 2006/0043789 A1 Mar. 2, 2006

(30) Foreign Application Priority Data
Nov. 14, 2002 (DE) .................. 102 53 013
Mar. 27, 2003 (DE) .................. 103 13 708

(51) Int. Cl.
*G01L 5/28* (2006.01)

(52) U.S. Cl. ....................................... 73/121

(58) Field of Classification Search .......... 73/121; 251/129.15
See application file for complete search history.

(56) References Cited

U.S. PATENT DOCUMENTS

| 5,887,851 | A | 3/1999 | Trzmiel |
| 6,312,061 | B1 * | 11/2001 | Schliebe et al. .............. 303/20 |
| 6,382,738 | B1 * | 5/2002 | Bayer et al. ............. 303/119.2 |
| 6,488,601 | B1 * | 12/2002 | Sommer et al. .............. 474/70 |
| 6,799,812 | B2 * | 10/2004 | Risch et al. ............. 303/119.2 |
| 6,883,874 | B2 * | 4/2005 | McCurdy et al. ............. 303/7 |
| 6,929,031 | B2 * | 8/2005 | Ford et al. .................. 137/884 |
| 7,007,552 | B2 * | 3/2006 | Weise et al. .................. 73/754 |
| 2002/0124655 | A1 | 9/2002 | Babala et al. |

FOREIGN PATENT DOCUMENTS

| DE | 195 14 383 A1 | 10/1996 |
| DE | 197 55 821 A1 | 6/1999 |
| DE | 198 25 464 A1 | 12/1999 |
| DE | 101 07 814 A1 | 5/2002 |
| EP | 1 068 120 B1 | 1/2001 |
| WO | WO 01/85511 A1 | 11/2001 |

\* cited by examiner

*Primary Examiner*—Michael Cygan
*Assistant Examiner*—Octavia Davis
(74) *Attorney, Agent, or Firm*—RatnerPrestia

(57) ABSTRACT

The invention relates to a pressure sensor module, in particular for electrohydraulic brake system, with several pressure sensors arranged in a sensor housing that is connected with its flange surface to the mounting surface of a hydraulic housing in such a fashion that several pressure ducts arranged in the sensor housing and in the hydraulic housing are interconnected. The invention discloses that a cylindrical element provided with two fastening sections is arranged between the flange surface and the mounting surface, with the first fastening section being operatively and/or positively connected to the sensor housing, while the second fastening section is operatively and/or positively connected to the hydraulic housing.

14 Claims, 4 Drawing Sheets

PRESSURE SENSOR MODULE

TECHNICAL FIELD

The present invention relates to a pressure sensor module for electronic brake systems in motor vehicles.

WO 01/85511 A1 discloses integrating pressure sensors into electronic brake control devices. The embodiments described in the mentioned publication relate to the integration of single sensors, which are fastened directly into a hydraulic unit by means of clinched engagement.

Generic EP 1068120 B1 discloses a pressure sensor module having pressure sensors, which are fastened in the sensor housing by way of sealing rings or holding rings in a sophisticated manner. In addition, the arrangement and the sophisticated fabrication of several boreholes or threaded holes in the sensor housing and hydraulic housing is required to interconnect both housings by several screws. Leakage can occur and the screws can loosen when the tightening moment of the screws falls below the necessary tightening moment.

In view of the above, an object of the invention is to provide a pressure sensor module that is most simple to manufacture and does not exhibit the above-mentioned drawbacks.

DETAILED DESCRIPTION OF THE PREFERRED EMBODIMENTS

Figure 1:
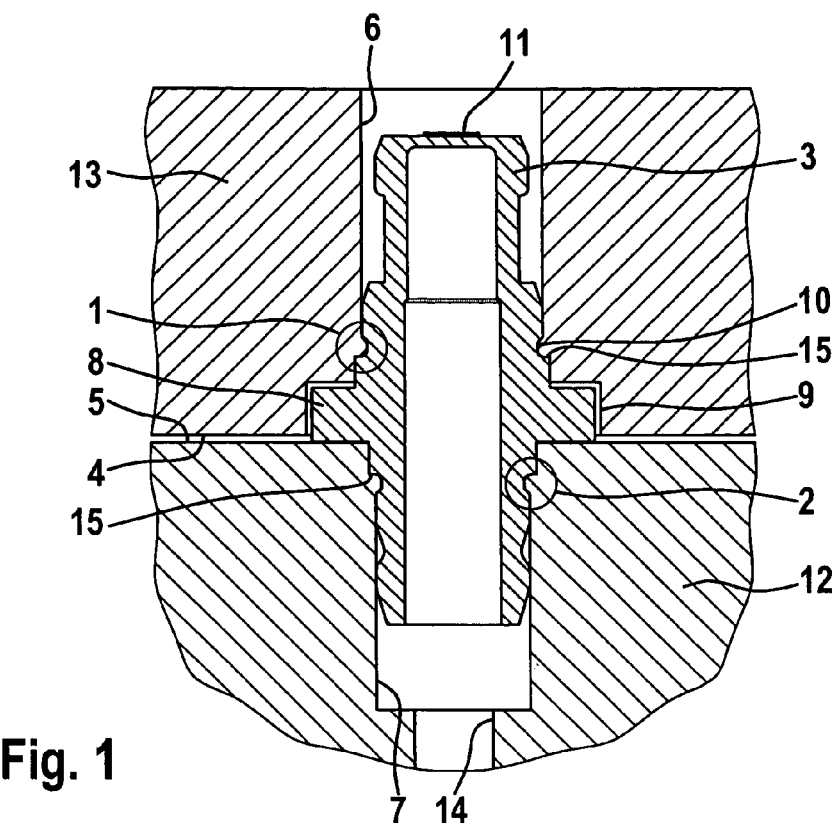
FIG. 1 is a view of a cross-section taken through a cylindrical element that is directed into a section of a sensor housing and into a section of a hydraulic housing, said housings being connected to the element exclusively by means of a housing deformation produced by self-calking.

FIGS. 1 to 6 present a pressure sensor module for use in electrohydraulic brake systems in particular. As is known, a pressure sensor module accommodates several pressure sensors arranged in a sensor housing 13, which is attached with its flange surface to the mounting surface of a hydraulic housing 12 in such a fashion that several pressure ducts 14 arranged in the sensor housing 13 and in the hydraulic housing 12 are interconnected for pressure detection.

According to the invention, a cylindrical element 3 provided with two fastening sections 1, 2 is arranged between the flange surface 4 and the mounting surface 5, said element extending from there with its diametrical fastening sections 1, 2 into the sensor and hydraulic housings 13, 12. As becomes apparent from FIGS. 1 to 6, a first accommodating bore 6 opens in each case into the flange surface 4 of the sensor housing 13, and the first fastening section 1 of the cylindrical element 3 extends into said accommodating bore in operative and/or positive engagement.

Further, it can be taken from FIGS. 1 to 6 that a second accommodating bore 7 opens into the mounting surface 5 of the hydraulic housing 12 and houses the second fastening section 2 of the cylindrical element 3 in operative and/or positive engagement. Arranged between the two fastening sections 1, 2 of the cylindrical element 3 is a bead 8 with two annular surfaces, and its annular surface close to the sensor housing 13 abuts on an edge of the first accommodating bore 6, while its second annular surface close to the hydraulic housing 12 abuts on an edge of the second accommodating bore 7. Both accommodating bores 6, 7 are coaxially aligned relative to each other, and one of the two accommodating bores 6, 7 includes a recess 9 into which the bead 8 plunges completely. The circular recess 9 is indented into the flange surface of the sensor housing 12 in the examples according to FIGS. 1 to 6.

Element 3 having a cylindrical structure includes at least one waist 10 of a great material hardness on the periphery of at least one of the two fastening sections 1, 2, into which waist either the material of the sensor housing 13 that is softer compared to the waist 10 or the material of the hydraulic housing 12 that is softer compared to the waist 10 is displaced for sealing and fastening purposes, depending on the depth of immersion of the element 3 into at least one of the two accommodating bores 6, 7. To this end, at least the fastening sections 1, 2 of element 3 provided with the waist 10 are made of steel, preferably of free-cutting steel, or brass. In comparison thereto, the sensor housing 13 and/or the hydraulic housing 12 is made of light metal, preferably of an aluminum wrought alloy. An extruded profile is especially appropriate for this purpose.

Figure 6:
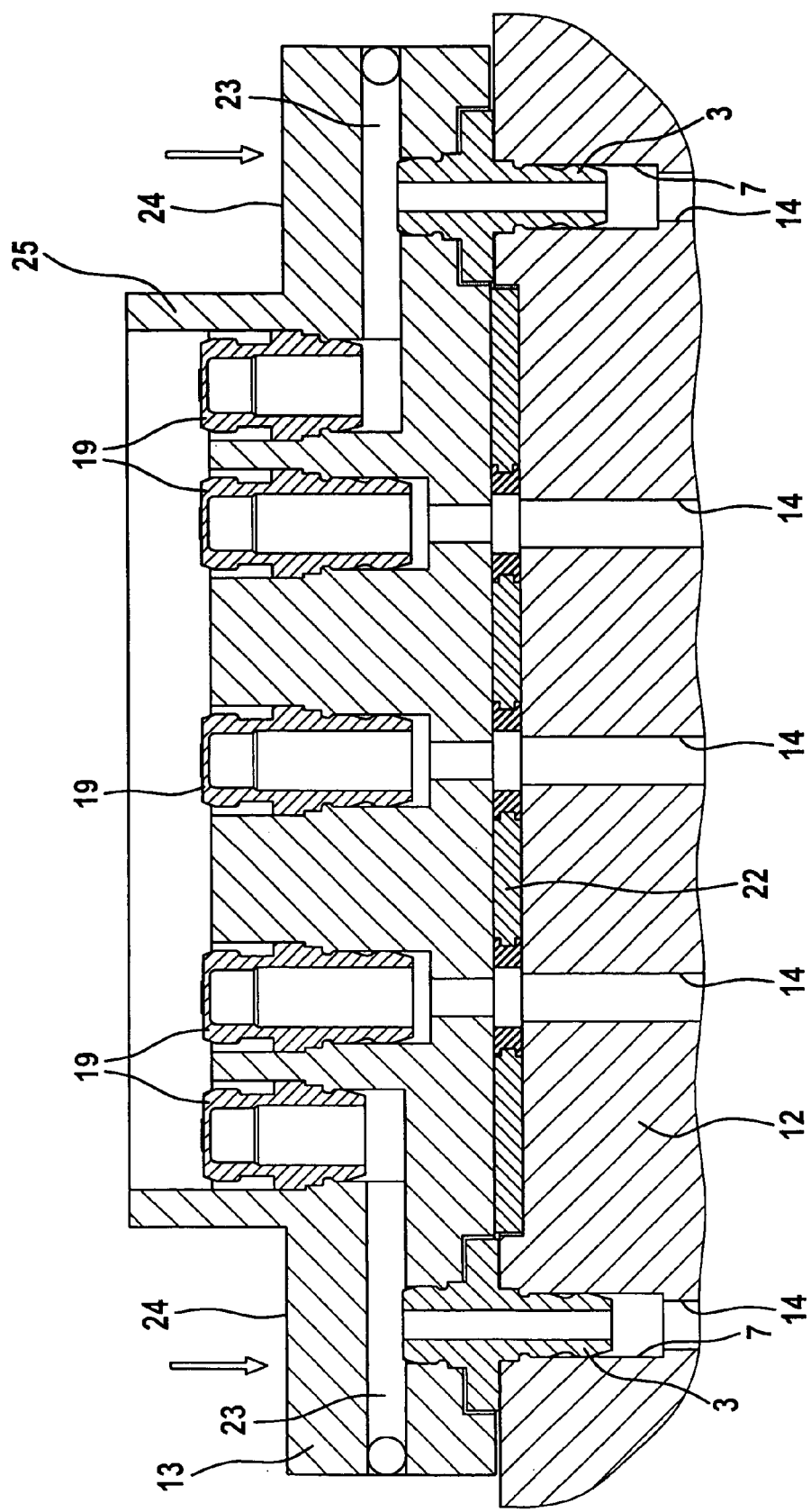
FIG. 6 shows, based on FIG. 5, a functional variation of the elements arranged at the ends of the sensor housing, said elements fulfilling a flow function in addition to an attachment function.

In FIG. 6 the cylindrical element 3 is favorably designed as a pressure pipe for conducting the pressure prevailing in the hydraulic housing 12 in the direction of the sensor housing 13 so that the element 3 fulfils not only a fastening function but also a flow function.

In addition, the invention arranges for the cylindrical element 3 to carry a measuring element 11 for detecting the pressure in the hydraulic housing 12, to what effect the cylindrical element 3 is configured as a meter tube, with the measuring element 11 being fastened to the meter tube end arranged in the sensor housing 13.

In addition to the common features explained in FIGS. 1 to 6, the special characteristics of each embodiment shown will be referred to briefly in the following.

FIG. 1 shows as a special feature the attachment of the element 3 in the hydraulic and sensor housings 12, 13 exclusively produced by self-calking at the two fastening sections 1, 2, to what end first of all the first fastening section 1 is press fitted into the stepped accommodating bore 6, so that the material of the sensor housing 13 that is softer compared to the element 3 is displaced into the waist or compressed, respectively, what is done by means of a step 15 adjacent to the waist 10. Thus, the element 3 quasi performs the function of a calking punch whose advance movement is produced by an axial force that is effective at bead 8. After the desired elements 3 have been fastened in the sensor housing 13, the sensor housing 13 is aligned with respect to the pressure ducts 14 in the hydraulic housing 12 and press fitted, with a defined force, by means of the second fastening sections 2 into the pressure ducts 14 for providing self-calking (self-clinch).

Figure 2:
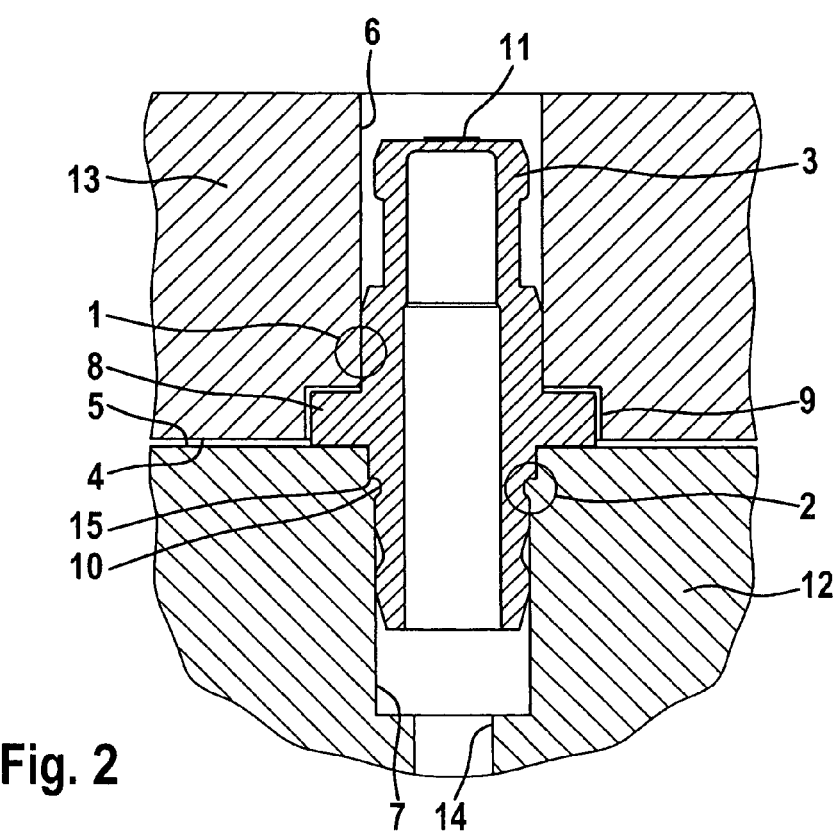
FIG. 2 is an alternative embodiment of the element shown in FIG. 1, with an attachment combination consisting of self-calking in the hydraulic housing and a press fit engagement of the element in the sensor housing.

Other than the object according to FIG. 1, the first tubular fastening section 1 is provided with a press fit in the embodiment according to FIG. 2 so that there is no need to arrange a waist 10 in the area of the first fastening section 1. Therefore, the first fastening section 1 is so fabricated that it is only slightly oversized with regard to the first accommodating bore 6. The press fit chosen is advantageous inasmuch as the sensor housing 13 can also be manufactured from steel, if desired or required. The second fastening section 2 is connected by way of self-calking, as has been described already with respect to FIG. 1.

Figure 3:
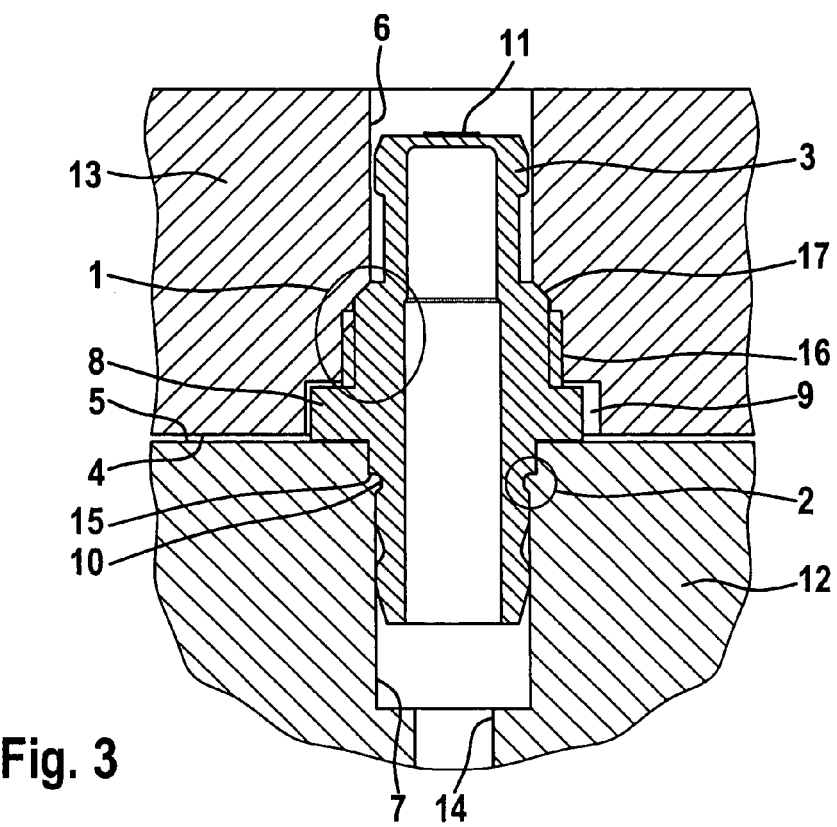
FIG. 3 shows, different from FIGS. 1 and 2, an attachment combination consisting of a screw coupling of the element with the sensor housing and a self-calking attachment of the element with the hydraulic housing.

Different from the previous embodiments, a thread 16 is used in FIG. 3 to connect the first fastening section 1 to the sensor housing 13. The element 3 is sealed in the sensor housing 13 by means of a sealing cone 17 at the first fastening section 1 which will abut on a conical sealing seat above the thread 16 after the element 3 has been screwed into the first accommodating bore 6. Similar to the previous examples, the second fastening section 2 is undetachably connected to the hydraulic housing 12 by means of self-calking, preventing also the thread 16 from detaching.

Figure 4:
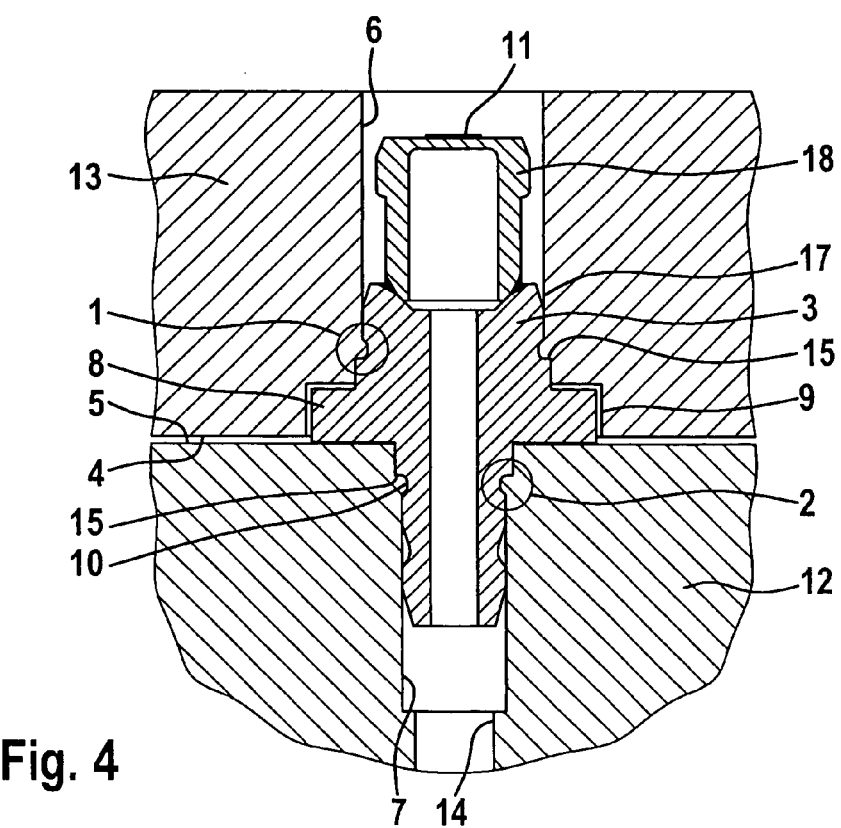
FIG. 4 shows different from FIG. 1 a weld joint of the element and a cap-shaped upper part.

Based on an attachment of the element 3 in the hydraulic and sensor housing 12, 13 according to FIG. 1, FIG. 4 shows that a cap-shaped upper part 18 is welded at the first fastening section 1 for the accommodation of a measuring element 11. This is advantageous because different materials can be employed as desired or required.

Figure 5:
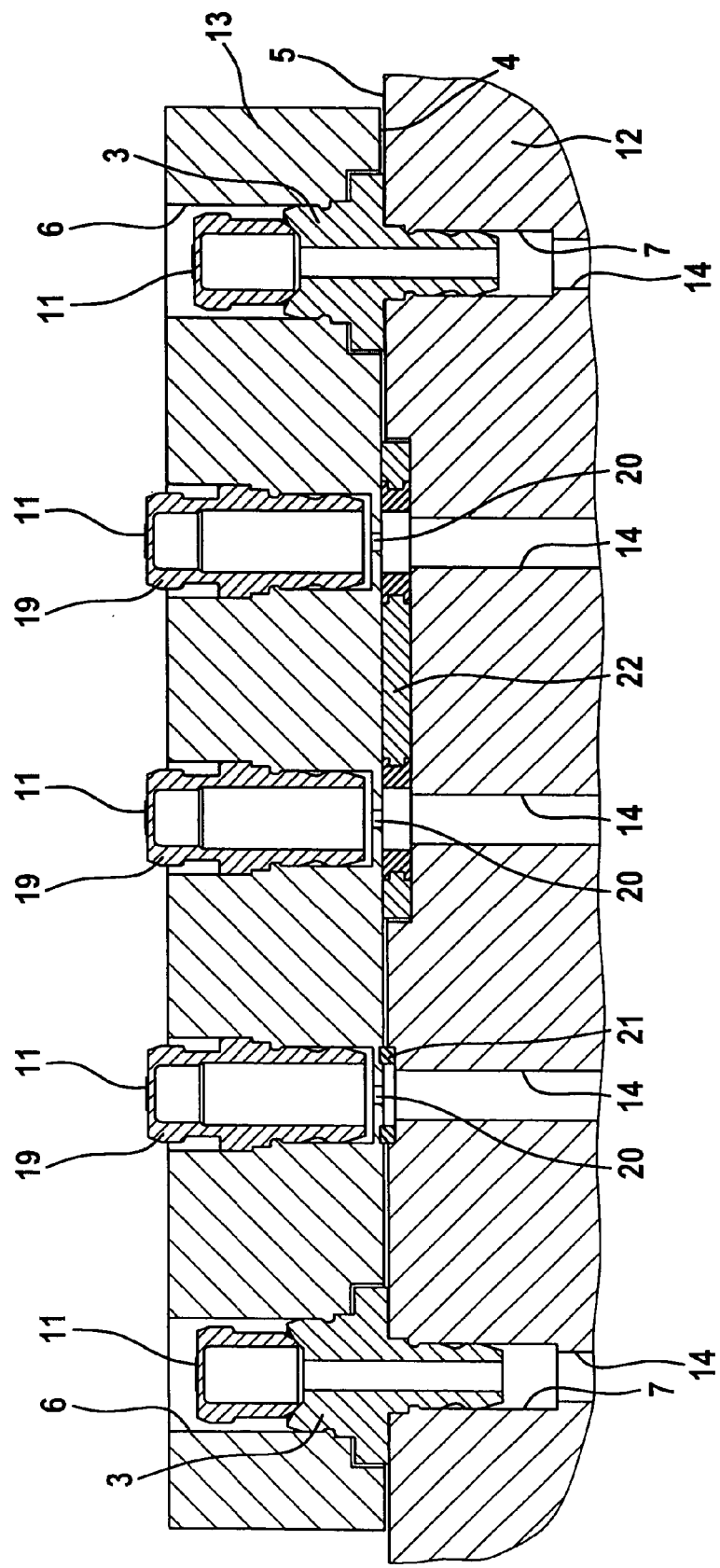
FIG. 5 is a total view of the sensor housing with several elements attached therein by means of self-calking, with only the elements arranged at the ends of the sensor housing being connected to the hydraulic housing by means of self-calking.

FIG. 5 is a cross-sectional side view of a block-shaped sensor housing 13, having several parallel tubular members attached by means of self-calking, with only the tubular members arranged at the two ends of the sensor housing 13 in their capacity of the initially mentioned elements 3 being connected to the hydraulic housing 12 by means of self-calking. Corresponding to their design according to FIG. 4, said elements 3 can accommodate measuring elements 11 also at their upper parts. Between the two elements 3, the tubular members arranged in the further accommodating bores 6 of the sensor housing 13 are only configured as calked measuring element carrier 19 which do not exhibit any mechanical connection to the hydraulic housing 12. Said measuring element carriers 19 are in connection to the pressure ducts 14 of the hydraulic housing 12 by way of pressure measuring bores 20 in the flange surface 4. The flange surface 4 is sealed relative to the mounting surface 5 in the area of the pressure measuring bores 20 either by way of single seals 21 or a sealing plate 22.

Different from the design of FIG. 5, the two outward elements 3 in FIG. 6 are only used as fastening elements called into the sensor housing and hydraulic housing 12, 13 and being connected by way of transverse channels 23 to two tubular members called into the sensor housing 13, said tubular members corresponding to the measuring element carriers 19 known from FIG. 5. Disposed between these two measuring element carriers 19 are further measuring element carriers 19 that correspond in their design and function to those explained with respect to FIG. 5. In the area of the two outward elements 3 the sensor housing 13 has a broad abutment surface being used to accommodate the necessary press-in force in order to calk the two outward elements 3 with the hydraulic housing 12. The broad abutment surface 24 is limited laterally by a housing frame 25 in which the measuring element carriers 19 and, as the case may be, also components or the entire necessary pressure sensor electronics is disposed. A housing cover (not shown) closes the housing frame 25.

The invention disclosed allows providing a pressure sensor module, which is particularly simple to fasten at a hydraulic housing and whose elements 3 suggested for the attachment are configured in such a manner that the elements 3 can fulfill additional functions such as the propagation of pressure into the sensor housing 13, and the accommodation of the measuring elements 11 required for the pressure detection, or a sealing function.

The invention claimed is:

1. A pressure sensor module, in particular for electrohydraulic brake systems, comprising:
    several pressure sensors arranged in a sensor housing that is connected with its flange surface to the mounting surface of a hydraulic housing in such a fashion that several pressure ducts arranged in the sensor housing and in the hydraulic housing are interconnected, wherein a cylindrical element provided with two fastening sections is arranged between the flange surface and the mounting surface and extends from there with its diametrical fastening sections into the sensor housing and hydraulic housing.

2. The pressure sensor module as claimed in claim 1, wherein a first accommodating bore opens into the flange surface of the sensor housing, and the first fastening section of the cylindrical element extends into said accommodating bore in operative and/or positive engagement.

3. The pressure sensor module as claimed in claim 1, wherein a second accommodating bore opens into the mounting surface of the hydraulic housing and houses the second fastening section of the cylindrical element in operative and/or positive engagement.

4. The pressure sensor module as claimed in claims 2, wherein arranged between the two fastening sections of the cylindrical element is a bead with two annular surfaces, and its annular surface close to the sensor housing is concealed by an edge of the first accommodating bore, while its second annular surface close to the hydraulic housing is concealed by an edge of the second accommodating bore.

5. The pressure sensor module as claimed in claim 3, wherein arranged between the two fastening sections of the cylindrical element is a bead with two annular surfaces, and its annular surface close to the sensor housing is concealed by an edge of the first accommodating bore, while its second annular surface close to the hydraulic housing is concealed by an edge of the second accommodating bore.

6. The pressure sensor module as claimed in claim 4, wherein both accommodating bores are coaxially aligned relative to each other, and wherein at least one of the two accommodating bores includes a recess into which the bead plunges at least in part.

7. The pressure sensor module as claimed in claim 2, wherein the cylindrical element includes at least one waist of a great material hardness on the periphery of at least one of the two fastening sections, into which waist either the material of the sensor housing that is softer compared to the waist or the material of the hydraulic housing that is softer compared to the waist is displaced for sealing and fastening purposes, depending on the depth of immersion of the element into at least one of the two accommodating bores.

8. The pressure sensor module as claimed in claim 3, wherein the cylindrical element includes at least one waist of a great material hardness on the periphery of at least one of the two fastening sections, into which waist either the material of the sensor housing that is softer compared to the waist or the material of the hydraulic housing that is softer compared to the waist is displaced for sealing and fastening purposes, depending on the depth of immersion of the element into at least one of the two accommodating bores.

9. The pressure sensor module as claimed in claim 7, wherein that at least the fastening section of element provided with the waist is made of steel, preferably of free-cutting steel, or brass.

10. The pressure sensor module as claimed in claim 7, wherein the sensor housing and/or the hydraulic housing is made of light metal, preferably of an aluminum wrought alloy.

11. The pressure sensor module as claimed in claim 7, wherein the sensor housing and/or the hydraulic housing is made of an extruded profile.

12. The pressure sensor module as claimed in claim 1, wherein the cylindrical element is designed as a pressure pipe for conducting the pressure prevailing in the hydraulic housing in the direction of the sensor housing.

13. The pressure sensor module as claimed in claim 1, wherein the cylindrical element carries a measuring element for detecting the pressure in the hydraulic housing, to what effect the cylindrical element is configured as a meter tube, with the measuring element being fastened to the meter tube end directed into the sensor housing.

14. The pressure sensor module as claimed in claim 1, wherein the first fastening section is operatively and/or positively connected to the sensor housing, while the second fastening section is operatively and/or positively connected to the hydraulic housing.

* * * * *